(12) United States Patent
Cho et al.

(10) Patent No.: US 11,130,471 B2
(45) Date of Patent: Sep. 28, 2021

(54) FINGERPRINT RECOGNITION VEHICLE CONTROL METHOD AND APPARATUS

(71) Applicants: Hyundai Motor Company, Seoul (KR); Kia Motors Corporation, Seoul (KR)

(72) Inventors: Jae Hyeong Cho, Gyeonggi-do (KR); Yeon Ji Kang, Gyeonggi-do (KR); Pill Yoon Kim, Gyeonggi-do (KR); Jae Min Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/848,148

(22) Filed: Apr. 14, 2020

(65) Prior Publication Data

US 2020/0324734 A1    Oct. 15, 2020

Related U.S. Application Data

(60) Provisional application No. 62/834,022, filed on Apr. 15, 2019.

(30) Foreign Application Priority Data

Apr. 2, 2020  (KR) .......................... 10-2020-0040430

(51) Int. Cl.
*B60R 25/04*  (2013.01)
*G06K 9/00*  (2006.01)
(Continued)

(52) U.S. Cl.
CPC .............. *B60R 25/04* (2013.01); *B60K 35/00* (2013.01); *B60Q 3/76* (2017.02); *B60R 25/252* (2013.01);
(Continued)

(58) Field of Classification Search
CPC ......... B60R 25/04; B60R 25/252; B60Q 3/76; B60K 35/00; B60K 2370/48;
(Continued)

(56) References Cited

U.S. PATENT DOCUMENTS

| 2014/0156149 A1* | 6/2014 | Feit | B60R 25/252 |
| | | | 701/49 |
| 2015/0291032 A1* | 10/2015 | Kim | G06F 3/0488 |
| | | | 701/36 |

(Continued)

*Primary Examiner* — Mohamed Barakat
(74) *Attorney, Agent, or Firm* — Mintz Levin Cohn Ferris Glovsky and Popeo, P.C.; Peter F. Corless

(57) ABSTRACT

A fingerprint recognition vehicle control apparatus according to an embodiment of the present invention includes: a display unit including a hemispherical display, optical fibers provided in the display and connected to the display through one end of the optical fibers, and a light source connected to the other ends of the optical fibers; a fingerprint recognition unit including a fingerprint recognition sensor and a fingerprint pattern light source provided in the display unit; a gearshift including a physical wheel for operating gear stages and indicators indicating gear states; and a controller operating on the basis of information received from the display unit, the fingerprint recognition unit and the gearshift.

18 Claims, 7 Drawing Sheets

(51) Int. Cl.
*B60R 25/25* (2013.01)
*B60K 35/00* (2006.01)
*B60Q 3/76* (2017.01)

(52) U.S. Cl.
CPC ..... *G06K 9/00087* (2013.01); *G06K 9/00335* (2013.01); *B60K 2370/126* (2019.05); *B60K 2370/146* (2019.05); *B60K 2370/336* (2019.05); *B60K 2370/48* (2019.05)

(58) Field of Classification Search
CPC ........ B60K 2370/336; B60K 2370/126; B60K 2370/146; G06K 9/00087; G06K 9/00335
See application file for complete search history.

(56) References Cited

U.S. PATENT DOCUMENTS

| | | | | |
|---|---|---|---|---|
| 2015/0298607 A1* | 10/2015 | Salter | ...................... | B60Q 3/76 315/77 |
| 2018/0167555 A1* | 6/2018 | Li | ........................ | H04N 13/111 |
| 2018/0365400 A1* | 12/2018 | Lopez-Hinojosa | ... | B60R 25/257 |
| 2019/0091738 A1* | 3/2019 | Chen | .................... | B08B 7/0057 |
| 2020/0262393 A1* | 8/2020 | Dadras | .................. | H04W 12/50 |

\* cited by examiner

FINGERPRINT RECOGNITION VEHICLE CONTROL METHOD AND APPARATUS

CROSS-REFERENCE TO RELATED APPLICATION(S)

This application claims the benefit of Korean Patent Application No. 10-2020-0040430, filed on Apr. 2, 2020, which is hereby incorporated by reference as if fully set forth herein. This application also claims the benefit of U.S. Provisional Application No. 62/834,022, filed on Apr. 15, 2019, the contents of which are hereby incorporated by reference in their entirety.

BACKGROUND

Field of the Invention

The present invention relates to a fingerprint recognition vehicle control method and apparatus, and more particularly, to a fingerprint recognition vehicle control method and apparatus that displays operating states of a vehicle by operating a gear through a physical wheel.

Discussion of the Related Art

A variety of new technologies for vehicles have been introduced in which vehicles execute a function as a transportation and also provide driver convenience. Accordingly, various convenience devices for allowing drivers to easily enter and start vehicles have recently been developed with the development of vehicle related technologies and actually applied to vehicles.

A conventional vehicle gear lever is formed in a stick shape and thus a speed-changing operation is performed according to operation of the gear lever in the vertical direction. However, the structural shapes of the conventional gearbox and gear lever unnecessarily occupy a space in a vehicle and the gear lever has a wide operating range, causing various problems in vehicle design.

SUMMARY

The present invention provides a fingerprint recognition vehicle control method and apparatus for displaying operating states of a vehicle by operating a gear through a physical wheel based on a hemispherical display and a fingerprint recognition unit.

It will be appreciated by persons skilled in the art that the objects that could be achieved with the present invention are not limited to what has been particularly described hereinabove and the above and other objects that the present invention could achieve will be more clearly understood from the following detailed description.

A fingerprint recognition vehicle control method, performed by a controller, according to an exemplary embodiment of the present invention may include: detecting a user; operating a fingerprint pattern light source and a light source in response to detection of the user; determining a fingerprint of the user; operating a vehicle to start when the fingerprint of the user is recognized; and operating the light source when the vehicle is started.

According to an exemplary embodiment, the operating of the fingerprint pattern light source and the light source in response to detection of the user may include turning on the fingerprint pattern light source and turning off the light source when the user is detected. The fingerprint recognition vehicle control method may further include receiving detection of operation of a physical wheel.

The fingerprint recognition vehicle control method may further include operating the light source to be turned on in response to operation of the physical wheel. Additionally, the fingerprint recognition vehicle control method may include determining a gear stage selected by the user in response to operation of the physical wheel and operating an indicator that corresponds to the determined gear stage to turn on the indicator and operate the light source to turn off the light source.

According to an exemplary embodiment, the fingerprint recognition vehicle control method may include determining a user gesture using a proximity sensor and turning on the light source based on the proximity sensor and operating the light source in a predetermined pattern. The fingerprint recognition vehicle control method may further include determining whether a door of the vehicle is opened using a sensor mounted within the vehicle and operating the light source such to turn on when the door of the vehicle is opened. Additionally, whether the door of the vehicle is closed after the door of the vehicle is opened may be determined and the light source may be operated to emit light in a predetermined pattern when the door of the vehicle is closed.

The fingerprint recognition vehicle control method and apparatus according to the present invention have the following advantages. Firstly, it may be possible to prevent an unauthorized person from handling a vehicle through fingerprint recognition. Secondly, it may be possible to improve driver convenience by adjusting starting of a vehicle and indicating starting of an engine using light through fingerprint recognition.

It will be appreciated by persons skilled in the art that the effects that can be achieved with the present invention are not limited to what has been particularly described hereinabove and other advantages of the present invention will be more clearly understood from the following detailed description.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
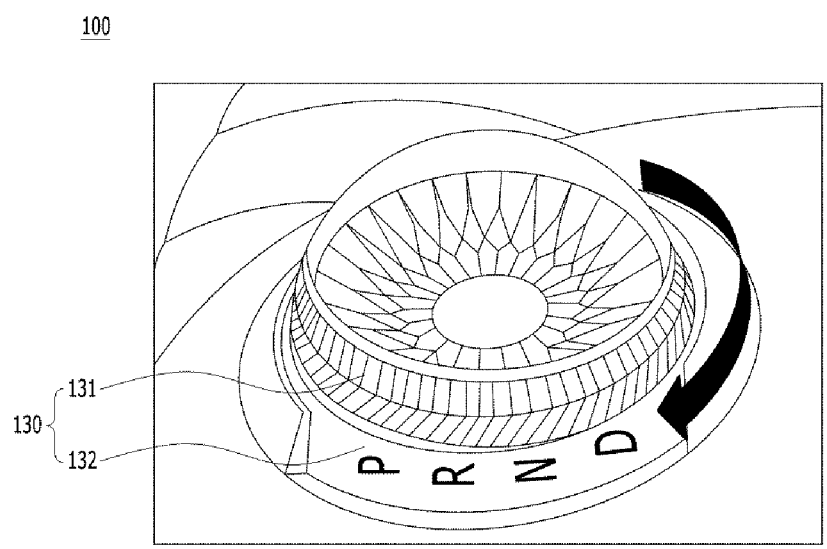
FIGS. 1 and 2 are diagrams showing a fingerprint recognition vehicle control apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, apparatuses and various methods to which embodiments of the present invention are applied will be described in detail with reference to the drawings. The suffixes "module" and "unit" of elements herein are used for convenience of description and thus can be used interchangeably and do not have any distinguishable meanings or functions. In the description of the embodiments, it will be understood that, when an element is referred to as being "on" or "under" and "before" or "after" another element, the element can be directly on another element or intervening elements may be present.

It will be understood that, although the terms first, second, A, B, (a), (b), etc. may be used herein to describe various elements of the present invention, these terms are only used to distinguish one element from another element and order or sequence of corresponding elements are not limited by these terms. It will be understood that when one element is referred to as being "connected to", "coupled to", or "accessing" another element, one element may be "connected to", "coupled to", or "access" another element via a further element although one element may be directly connected to or directly access another element.

Further, the term "comprises", "includes", or "has" described herein should be interpreted not to exclude other elements but to further include such other elements since the corresponding elements may be included unless mentioned otherwise. All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless differently defined in the present invention, such terms should not be interpreted in an ideal or excessively formal manner.

Figure 2:
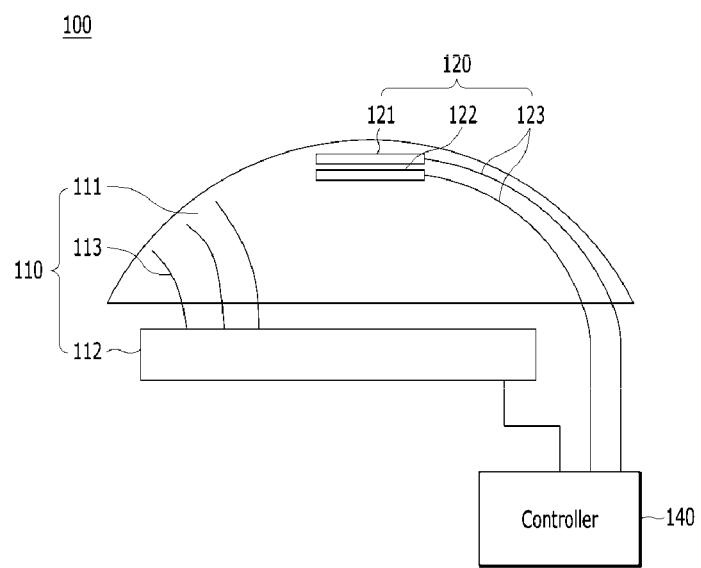

FIGS. 1 and 2 are diagrams showing a fingerprint recognition vehicle control apparatus according to an exemplary embodiment of the present invention. FIG. 1 is a perspective view of the fingerprint recognition vehicle control apparatus according to an exemplary embodiment of the present invention and FIG. 2 is a cross-sectional view of a fingerprint recognition vehicle control apparatus according to a first exemplary embodiment of the present invention.

Referring to FIGS. 1 and 2, the fingerprint recognition vehicle control apparatus may include a display unit 110, a fingerprint recognition unit 120, a gearshift 130, and a controller 140. The display device 110 may include a curved display 111 having a hemispherical shape. This display 111 may be formed of a transparent material such as acryl.

The display unit 110 may include optical fibers 113 arranged in a predetermined pattern therewithin and emit light emitted from a light source 112 through the optical fibers 113 to the outside. In particular, light may be emitted to the outside in a predetermined pattern according to the light source 112. The display 111 of the main body may be configured as an electrostatic touchscreen panel. A user may receive touch input through the touchscreen.

The fingerprint recognition unit 120 may include a fingerprint recognition sensor 121 and a fingerprint pattern light source 122. The fingerprint recognition sensor 121 may be disposed at the upper part of the fingerprint recognition vehicle control apparatus. Particularly, the fingerprint recognition sensor 121 may be disposed under the display 111 and the fingerprint pattern light source 122 may be disposed under the fingerprint recognition sensor 121. The fingerprint recognition sensor 121 and the fingerprint pattern light source 122 may be connected to the controller 140 via a transparent wiring 123.

The gearshift 130 may be disposed at the lower part of the display unit 110. Additionally, the gearshift 130 may include a physical wheel 131 for operating gear stages and an indicator 132 configured to indicate gear states. The physical wheel 131 may be disposed under the display unit 110. In addition, the physical wheel 131 may be disposed to surround the lower part of the display unit 110. The physical wheel 131 may be used to select a gear stage of a vehicle in response to an operation of a user.

According to an exemplary embodiment, one of gear stages park (P), reverse (R), neutral (N) and drive (D) of the vehicle may be selected through the physical wheel 131. The indicator 132 may include P, R, N and D indicators that correspond to the gear stages of the vehicle. A gear stage selected according to operation of the physical wheel 131 may be illuminated through the indicator 132.

The controller 140 may be configured to receive user detection information from the vehicle. According to an exemplary embodiment, the controller 140 may be configured to determine that a user has been detected in response to receiving a user door open signal and then receiving a user door close signal. The controller 140 may be configured to determine that a user has been detected when a user weight signal is received from a vehicle seat. Additionally, the controller 140 may be configured to determine that a user has been detected when information regarding the user is received from a camera disposed within the vehicle.

In response to detecting a user in the vehicle, the controller 140 may be configured to turn on the fingerprint pattern light source 122 and turn off the light source 112. Accordingly, the controller 140 may be configured to display a position at which the fingerprint recognition sensor 121 is disposed on the display unit 110. When a user performs fingerprint recognition, the controller 140 may be configured to receive recognition from the fingerprint recognition sensor 121. When the user receives fingerprint recognition, the controller 140 may be configured to start the vehicle. When the vehicle is started, the controller 140 may be configured to operate the light source 112 to turn on the light source 112. When the light source 112 is turned on, the light source may be configured to emit light. When the controller 140 detects operation of the physical wheel 132 through the display unit 110, the controller 140 may be configured to operate the light source 112 to turn on the light source 112.

The controller 140 may be configured to change gears in response to the operation of the physical wheel 131. When a gear stage is selected through the physical wheel 131, the controller 140 may be configured to selectively turn on one of P, R, D and D of the indicator 132 that indicates a gear state and turn off the light source 112. In response to the controller 140 receiving a vehicle door open signal, the controller 140 may be configured to turn on the light source 112. Thereafter, when the controller 140 does not receive a vehicle door close signal, the controller 140 may be configured to operate the light source 112 in a predetermined pattern.

Figure 3:
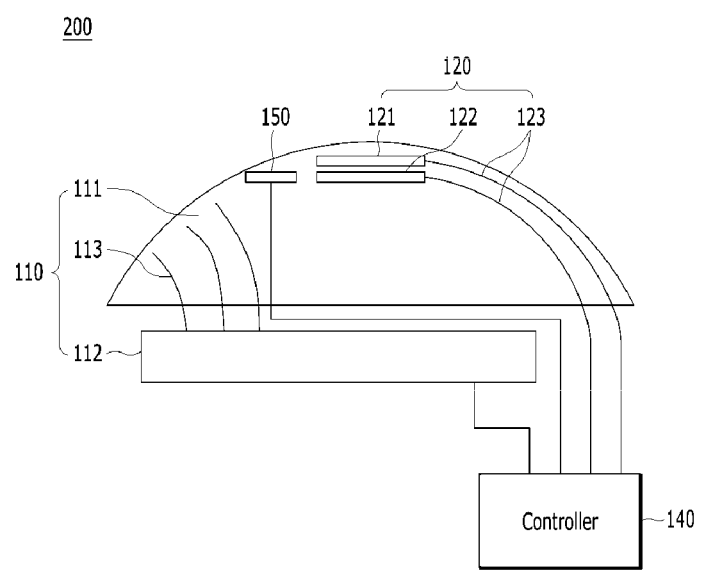
FIG. 3 is a cross-sectional view of a fingerprint recognition vehicle control apparatus according to a second exemplary embodiment of the present invention.

FIG. 3 is a cross-sectional view of a fingerprint recognition vehicle control apparatus according to a second exemplary embodiment of the present invention. Referring to FIG. 3, the fingerprint recognition vehicle control apparatus may include a display unit 110, a fingerprint recognition unit 120, a gearshift 130, a controller 140 and a proximity sensor 150. The display unit 110, the fingerprint recognition unit 120 and the gearshift 130 are the same as those of the first exemplary embodiment and thus description thereof is not omitted.

The proximity sensor 150 may be disposed at the upper part of the fingerprint recognition vehicle control apparatus. In particular, the proximity sensor 150 may be disposed around the fingerprint recognition sensor 121. The proximity sensor 150 may be disposed to surround the fingerprint recognition sensor 121. The proximity sensor 150 may also be connected to the controller 140 via a transparent wiring.

The proximity sensor 150 may be a sensor configured to detect a gesture of a user. In particular, the proximity sensor 150 may be configured to detect a gesture of a user in a recognition area of the fingerprint recognition sensor 121. The proximity sensor 150 may be configured to detect a gesture of a user and provide the detected gesture to the controller 140. When the proximity sensor 150 detects a gesture of a user, the controller 140 may be configured to turn on the fingerprint pattern light source 122 and turn off the light source 112. Accordingly, the controller 140 may be configured to display a position at which the fingerprint recognition sensor 121 is disposed on the display unit 110.

The proximity sensor 150 may be configured to detect a gesture of a user outside the recognition area of the fingerprint recognition sensor 121. Then, the controller 140 may be configured to turn off the light source 112 and controls the light source 112 in a predetermined pattern on the basis of the proximity sensor 150. When a user is detected through the proximity sensor 150, the controller 140 may be configured to determine a gesture of the user by detecting whether there is data input within a predetermined time. When a gesture of a user is detected using the proximity sensor 150, the controller 140 may be configured to turn on the fingerprint pattern light source 122 and turn off the light source 112. Accordingly, the controller 140 may be configured to display a position at which the fingerprint recognition sensor 121 is disposed on the display unit 110.

Figure 4:
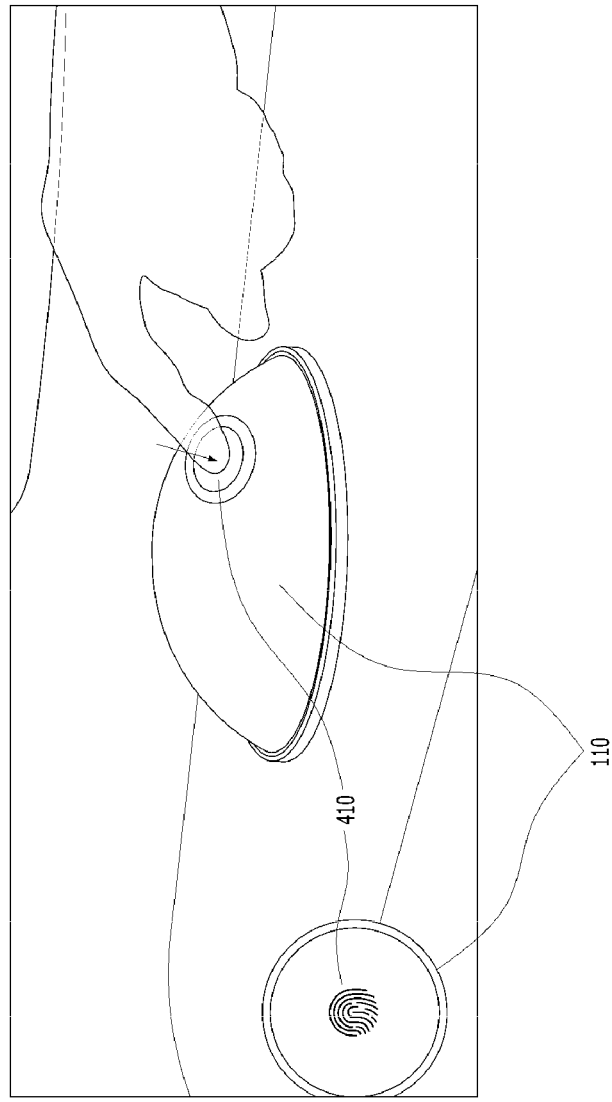
FIG. 4 is a diagram for describing fingerprint pattern display of the fingerprint recognition vehicle control apparatus according to an exemplary embodiment of the present invention.

FIG. 4 is a diagram for describing fingerprint pattern display of the fingerprint recognition vehicle control apparatus according to an exemplary embodiment of the present invention. Referring to FIG. 4, when the fingerprint pattern light source 122 is turned on, a predetermined fingerprint pattern may be displayed on the display unit 110. In other words, when the fingerprint pattern may be displayed on the display 111, a user may touch a fingerprint recognition region 410 with a finger to attempt fingerprint recognition.

The fingerprint recognition region 410 may be disposed on the top side of the hemispherical display 111. According to an exemplary embodiment, the fingerprint recognition region 410 may be disposed at the center of the upper part of the hemispherical display 111. The fingerprint recognition region 410 may be disposed on the side of the hemispherical display 111.

Additionally, the controller 140 may be configured to determine whether the touch input is an input of the user. In particular, the controller 140 may be configured to receive the touch input and determine the touch input as a user input when the data input to the fingerprint recognition sensor 121 matches the previously stored data. The controller 140 may be configured to output result data based on a touch position and a pattern that corresponds to the touch input.

According to an exemplary embodiment, when the light source 112 of the display unit 110 is turned on and a user touch input is received through the fingerprint recognition sensor 121, the controller 140 may be configured to turn off the light source 112 of the display unit 110. According to another exemplary embodiment, when the light source 112 of the display unit 110 is turned off and user touch input is received through the fingerprint recognition sensor 121, the controller 140 may be configured to turn on the light source 112 of the display unit 110.

Figure 5:
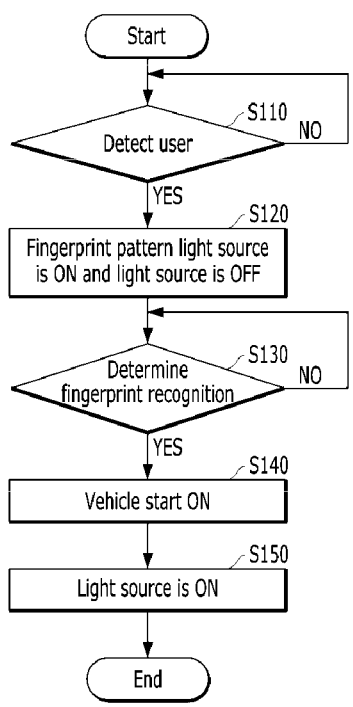
FIG. 5 is a diagram for describing a light source control operation of the fingerprint recognition vehicle control apparatus according to an exemplary embodiment of the present invention.

FIG. 5 is a diagram for describing an operation of operating the light source 112 of the fingerprint recognition vehicle control apparatus according to an exemplary embodiment of the present invention. Referring to FIG. 5, the controller 140 may be configured to determine whether a user is detected using a sensor mounted within a vehicle (S110).

When a user is detected (YES in S110) after step S110, the controller 140 may be configured to operate the fingerprint pattern light source 122 to turn on and operate the light source 112 to turn off (S120). On the other hand, when a user is not detected (NO in S110), the controller 140 may be configured to re-determine whether a user is detected. After step S120, the controller 140 may be configured to determine whether a fingerprint of the user is detected through the fingerprint recognition sensor 121 (S130).

After step S130, the controller 140 may be configured to operate the vehicle to start (S140) when the fingerprint of the user is detected using the fingerprint recognition sensor 121 (YES in S130). On the other hand, when the fingerprint of the user is not detected (NO in S140), the controller 140 may be configured to re-determine whether the fingerprint of the user is detected using the fingerprint recognition sensor. After step S140, the controller 140 may be configured to turn on the light source 112 (S150) when the vehicle is operated to be started.

Figure 6:
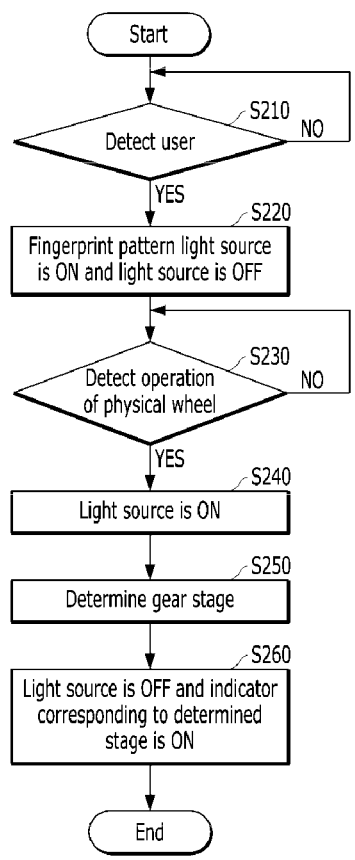
FIG. 6 is a diagram for describing a gear stage control operation of the fingerprint recognition vehicle control apparatus according to an exemplary embodiment of the present invention.

FIG. 6 is a diagram for describing an operation of controlling gear stages of the fingerprint recognition vehicle control apparatus according to an exemplary embodiment of the present invention. Referring to FIG. 6, the controller 140 may be configured to determine whether a user is detected using a sensor mounted within a vehicle (S210).

When a user is detected (YES in S210) after step S210, the controller 140 may be configured to turn on the fingerprint pattern light source 122 and turn off the light source 112 (S220). On the other hand, when a user is not detected (NO in S210), the controller 140 may be configured to re-determine whether a user is detected. After step S220, the controller 140 may be configured to detect operation of the physical wheel 131 (S230).

After step S230, the controller 140 may be configured to turn on the light source 112 when operation of the physical wheel 131 is detected (S240). In particular, the controller 140 may be configure to operate the light source 112 such that the display unit 110 emits light in a predetermined pattern. After step S240, the controller 140 may be configured to determine gear stage selection according to operation of the physical wheel 131 (S250). In particular, the controller 140 may be configured to determine a gear stage according to operation of the physical wheel 131 as one of the gear stages P, R, N and D. After step S250, the controller 140 may be configured to turn off the light source 112 and turn on the indicator 132 that corresponds to the determined gear stage (S260).

Figure 7:
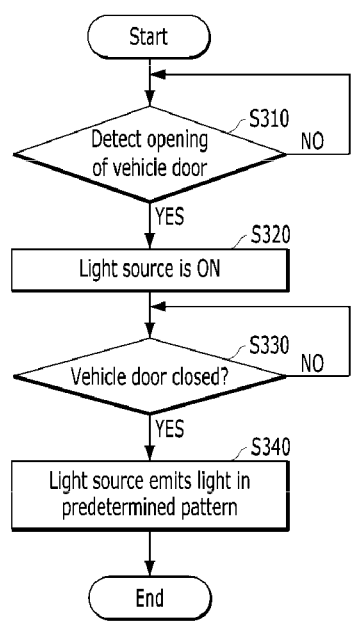
FIG. 7 is a flowchart illustrating a fingerprint recognition vehicle control method according to an exemplary embodiment of the present invention.

FIG. 7 is a flowchart showing a flow of a fingerprint recognition vehicle control method according to an exemplary embodiment of the present invention. Referring to FIG. 7, the controller 140 may be configured to determine whether a door of a vehicle is opened using a sensor mounted within the vehicle (S310).

After step S310, the controller 140 may be configured turn on the light source 112 (S320) in response to determining that the door of the vehicle is opened (YES in S310). In response to determining that a door of the vehicle is not opened (NO in S310), the controller 140 may be configured to re-determine whether a door of the vehicle is opened. After step S320, the controller 140 may be configured to determine whether the door of the vehicle is closed (S330). In response to determining that the door of the vehicle is not closed (NO in S330), the controller 140 may be configured to re-determine whether the door of the vehicle is closed. After step S330, the controller 140 may be configured to turn on the light source 112 (S340) when the door of the vehicle is closed (YES in S330). Particularly, the controller may be configured to operate the light source 112 such that the display unit 110 emits light in a predetermined pattern.

The above-described method according to an exemplary embodiment may be implemented as a program to be executed in a computer and stored in a non-transitory computer-readable recording medium, and examples of the non-transitory computer-readable recording medium include a ROM, a RAM, a CD-ROM, a magnetic tape, a floppy disk, an optical input data storage system, etc. The non-transitory computer-readable recording medium is distributed to a computer system connected via a network, and processor-readable code may be saved and executed according to a distributed system. Further, a function program, code and code segments for implementing the above-described method can be easily deduced by programmers skilled in the art.

What is claimed is:

1. A fingerprint recognition vehicle control method, comprising:
    detecting, by a controller, presence of a user in a vicinity of a vehicle;
    operating, by the controller, a fingerprint pattern light source having a predetermined fingerprint-shape emitting pattern and a light source in response to detection of the user;
    determining, by the controller, a fingerprint of the user sensed by a fingerprint recognition sensor;
    operating, by the controller, the vehicle to be started in response to recognizing the fingerprint of the user; and
    operating, by the controller, the light source in response to starting the vehicle,
    wherein the fingerprint pattern light source is disposed under the fingerprint recognition sensor,
    wherein the light source is disposed under the fingerprint pattern light source, and
    wherein one end of each of a plurality of optical fibers is connected to the light source and another end of each of the plurality of optical fibers is disposed around the fingerprint pattern light source.

2. The fingerprint recognition vehicle control method of claim 1, wherein the operating of the fingerprint pattern light source and the light source in response to detection of the user includes turning on the fingerprint pattern light source and turning off the light source in response to detecting the user.

3. The fingerprint recognition vehicle control method of claim 1, further comprising receiving, by the controller, detection of operation of a physical wheel; and
    operating, by the controller, the light source to turn on in response to operation of the physical wheel.

4. The fingerprint recognition vehicle control method of claim 3, further comprising:
    determining, by the controller, a gear stage selected by the user in response to operation of the physical wheel; and
    controlling an indicator corresponding to the determined gear stage such that the indicator is turned on and controlling the light source such that the light source is turned off.

5. The fingerprint recognition vehicle control method of claim 1, further comprising determining a user gesture through a proximity sensor.

6. The fingerprint recognition vehicle control method of claim 5, further comprising turning on the light source on the basis of the proximity sensor and controlling the light source in a predetermined pattern.

7. The fingerprint recognition vehicle control method of claim 1, comprising:
    determining whether a door of the vehicle is opened through a sensor provided in the vehicle; and
    controlling the light source such that the light source is turned on when the door of the vehicle is opened.

8. The fingerprint recognition vehicle control method of claim 7, further comprising:
    determining whether the door of the vehicle is closed after the door of the vehicle is opened; and
    controlling the light source such that the light source emits light in a predetermined pattern when the door of the vehicle is closed.

9. A non-transitory computer-readable recording medium storing a program for executing the fingerprint recognition vehicle control method according to claim 1.

10. A fingerprint recognition vehicle control apparatus comprising:
  a transparent hemispherical part including optical fibers provided in the transparent hemispherical part, and a light source connected to one end of each of the optical fibers;
  a fingerprint recognition unit including a fingerprint recognition sensor and a fingerprint pattern light source having a predetermined fingerprint-shape emitting pattern provided in the transparent hemispherical part;
  a gearshift including a physical wheel for operating gear stages and indicators indicating gear states; and
  a controller operating on the basis of information received from the transparent hemispherical part, the fingerprint recognition unit and the gearshift,
  wherein the fingerprint pattern light source is disposed under the fingerprint recognition sensor,
  wherein the light source is disposed under the fingerprint pattern light source, and
  wherein one end of each of the optical fibers is disposed around the fingerprint pattern light source.

11. The fingerprint recognition vehicle control apparatus of claim 10, wherein the controller configured to:
  detect a user in a vehicle;
  control the fingerprint pattern light source and the light source in response to detection of the user;
  determine a fingerprint of the user;
  control the vehicle such that the vehicle is started when the fingerprint of the user is recognized; and
  control the light source when the vehicle is started.

12. The fingerprint recognition vehicle control apparatus of claim 11, wherein the controller controls the fingerprint pattern light source such that the fingerprint pattern light is turned on and controls the light source such that the light source is turned off when the user is detected.

13. The fingerprint recognition vehicle control apparatus of claim 10, wherein the controller received detection of operation of the physical wheel and controls the light source such that the light source is turned on in response to operation of the physical wheel.

14. The fingerprint recognition vehicle control apparatus of claim 10, wherein the controller determines a gear stage selected by the user in response to operation of the physical wheel, controls an indicator corresponding to the determined gear stage such that the indicator is turned on, and controls the light source such that the light source is turned off.

15. The fingerprint recognition vehicle control apparatus of claim 10, further comprising
  a proximity sensor provided in proximity to the fingerprint recognition sensor,
  wherein the controller determines a user gesture through the proximity sensor.

16. The fingerprint recognition vehicle control apparatus of claim 15, wherein the controller turns on the light source and controls the light source in a predetermined pattern on the basis of the proximity sensor.

17. The fingerprint recognition vehicle control apparatus of claim 10, wherein the controller determines whether a door of the vehicle is opened through a sensor provided in the vehicle and controls the light source such that the light source is turned on when the door of the vehicle is opened.

18. The fingerprint recognition vehicle control apparatus of claim 17, wherein the controller determines whether the door of the vehicle is closed after the door of the vehicle is opened and controls the light source such that the light source emits light in a predetermined pattern when the door of the vehicle is closed.

\* \* \* \* \*